(12) United States Patent
Mills et al.

(10) Patent No.: US 6,893,371 B2
(45) Date of Patent: May 17, 2005

(54) TRANSMISSION ACTUATOR DRIVEN BY AN ELECTRIC MOTOR

(75) Inventors: John Mills, Warwickshire (GB); Bernhard Boll, Alling (DE); Geir Huseby, Kongsberg (NO); Gunter Hirt, Kongsberg (NO); Viggo Norum, Kongsberg (NO); Jan Oyen, Kongsberg (NO); Lars Lein, Kongsberg (NO); Nigel Barnes, Cheshire (GB); Simen Ronne, Kongsberg (NO)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/436,496

(22) Filed: May 7, 2003

(65) Prior Publication Data

US 2004/0055404 A1 Mar. 25, 2004

Related U.S. Application Data

(63) Continuation of application No. PCT/DE01/04134, filed on Nov. 2, 2001.

(30) Foreign Application Priority Data

Nov. 7, 2000 (DE) .......................................... 100 55 143
Jul. 19, 2001 (GB) .............................................. 0117563
Jul. 19, 2001 (GB) .............................................. 0117564

(51) Int. Cl.$^7$ ................................................ F16H 48/06
(52) U.S. Cl. ...................................... 475/149; 74/337.5
(58) Field of Search ......................... 475/149; 74/337.5, 74/640

(56) References Cited

U.S. PATENT DOCUMENTS

| 4,850,457 A | * | 7/1989 | Taig ........................... 188/72.1 |
| 5,625,502 A | * | 4/1997 | Hoogenboom et al. ..... 359/872 |
| 6,370,976 B1 | * | 4/2002 | Doppling et al. .......... 74/337.5 |

FOREIGN PATENT DOCUMENTS

| EP | 0 155 043 A1 | 9/1985 |
| EP | 0 481 168 A1 | 4/1992 |
| EP | 0 537 693 A1 | 4/1993 |
| EP | 0 547 007 A1 | 6/1993 |

* cited by examiner

Primary Examiner—Dirk Wright
(74) Attorney, Agent, or Firm—Darby & Darby

(57) ABSTRACT

An actuator for a motor vehicle transmission has a shift cylinder performing rotary actuating movements. An electric motor is arranged inside the shift cylinder and drives the latter either through a harmonic drive mechanism or a planetary drive mechanism. The arrangement provides a high reduction ratio and an efficient use of limited space.

35 Claims, 13 Drawing Sheets

TRANSMISSION ACTUATOR DRIVEN BY AN ELECTRIC MOTOR

CROSS-REFERENCE TO RELATED APPLICATION

This application is a continuation of International Patent Application Ser. No. PCT/DE 01/04134, filed Nov. 2, 2001, which is hereby incorporated by reference in its entirety.

BACKGROUND OF THE INVENTION

The present invention relates to shift-actuating members, more specifically to actuators that are driven by electric motors and are used for the control of a gear-shifting mechanism of an automatic transmission system in a motor vehicle.

Electrically powered actuators used for the control of gear-shifting mechanisms of automatic transmission systems usually incorporate a worm gear mechanism in order to achieve a high reduction ratio, i.e., to change the high-rpm and relatively low-torque output of the electric motor into a relatively high torque at a low rpm-rate as required for actuating a gear-shifting mechanism. The foregoing concept is disclosed for example in GB 2325036, GB 2313885, and GB 2309761, which are hereby explicitly referenced and whose content will be expressly cited in the disclosure of the present invention. The reduction ratios of these kinds of actuating mechanisms are usually of the order of 40:1 to 60:1.

The worm gear mechanisms used heretofore have the disadvantage that they are relatively large and present serious spatial difficulties in view of the installation constraints that are encountered in automatic transmission systems for motor vehicles.

Further in this regard, special difficulties occur when electrically powered actuators are used with shift cylinders, as disclosed for example in GB 2308874 and GB 2311829, which are hereby explicitly referenced and whose content will be expressly cited in the disclosure of the present invention.

Transmissions of the aforementioned kind are further disclosed in EP 0654624. The shift mechanism of the transmissions in EP 0654624 are driven by an electric motor that is arranged outside of the transmission and uses gear stages to move the shift cylinder for actuating a gear change. Even more space is required if two or more so-called shift cylinders are used for example to also actuate clutches that are associated with transmissions. The actuation by means of a shift cylinder is advantageous, e.g., in the case of dual-clutch transmissions or power-shift transmissions with power-shift clutches.

OBJECT OF THE INVENTION

The present invention has the objective to provide a transmission, and further to provide an actuating device which can be installed in a more compact space than state-of-the-art devices and which is nevertheless simple and cost-effective to manufacture.

SUMMARY OF THE INVENTION

An advantageous embodiment of the present invention uses a drive mechanism with a high reduction ratio that is configured concentrically with a shift cylinder, resulting in a compact electrically powered shift-actuating member.

An electrically powered actuating member for the control of a gear-shifting mechanism of a motor vehicle according to one facet of the present invention has a fastening element that allows the actuating member to be mounted on a carrier element. The actuating member has a shift cylinder that is rotatable relative to the fastening element, and an electric motor arranged coaxially inside the shift cylinder. The electric motor has a stator mounted non-rotatably relative to the fastening element and a rotor connected to the shift cylinder through a so-called harmonic drive mechanism.

The harmonic drive mechanism has a wave generator rigidly connected to and driven by the rotor of the electric motor. A rigid circular spline ring with internal spline teeth is mounted concentrically with the elliptical wave generator and non-rotatable relative to the fastening element. A flexible spline gear with external spline teeth, arranged between the wave generator and the rigid circular spline ring, is connected to and driving the shift cylinder. The flexible spline gear has fewer spline teeth than the rigid circular spline ring, and the wave generator is shaped so that the external spline teeth of the flexible spline gear locally mesh with the internal spline teeth of the rigid circular spline ring in places that are at angular intervals from each other, while the spline teeth between the meshing locations are fully separated from engagement with each other. The harmonic drive in the sense of the present invention has been disclosed, e.g., in DE 199 27 957 under the term "Wellengetriebeeinrichtung" (wave drive device). Other reduction-ratio devices that can be advantageously employed include, e.g., differential drive mechanisms, planetary mechanisms, and other devices.

The electric motor and the harmonic drive mechanism in the actuating member of the foregoing description are arranged coaxially inside the shift cylinder, whereby a compact actuator configuration is achieved. The reduction ratio i of the harmonic drive mechanism depends on the difference between the number of internal spline teeth on the rigid circular spline ring and the number of external spline teeth on the flexible spline gear, expressed in mathematical terms:

$$i = \frac{-n}{N},$$

wherein n stands for the difference between the respective numbers of teeth on the rigid circular spline ring and the flexible spline gear, and N stands for the number of teeth on the flexible spline gear. The negative sign of the ratio i indicates that the flexible spline gear (and thus the shift cylinder) turns in the opposite direction of the rotor of the electric motor.

The reduction ratio i is preferably in the range between −40:1 and −60:1. As a typical example, the rigid circular spline ring may have 102 teeth and the flexible spline gear 100 teeth, corresponding to a reduction ratio of −50:1.

According to an embodiment of the invention, the shift-cylinder actuators with electric motors are configured as assembly modules, so that they could be mounted in a suitable position, e.g., on the transmission housing to operate the gear-selecting mechanism. It is however advantageous to use actuators with two shift cylinders in particular for applications in dual-clutch transmission systems of the kind disclosed in the simultaneously pending UK patent applications GB 0028310 and GB 0103312, the diclosures of which are hereby expressly referenced and whose content is explicitly cited in the present application. The shift cylinder actuators of the present invention can further be arranged advantageously inside a transmission housing of a motor vehicle.

According to a further concept of the present invention, an electrically powered actuator for operating a clutch mechanism or a gear-selection mechanism or a brake of a motor vehicle contains an electric motor, a rotor shaft of the electric motor, and an orbital drive mechanism with a sun gear rigidly connected to the rotor shaft of the electric motor. A ring-shaped planet carrier is arranged coaxial with and rotatable relative to the rotor shaft of the electric motor. A set of planet gears is arranged in a symmetric angular distribution on the planet carrier. The planet gears mesh with the external teeth of the sun gear and with two internally toothed ring gears. The first of the two ring gears is stationary, while the second ring gear is formed on an output element that is arranged coaxial with and rotatable relative to the rotor shaft of the electric motor. The first and second ring gears have different numbers of internal teeth in order to provide the required gear-reduction ratio.

According to a preferred embodiment of the present invention, each planet gear is configured as a dual-pinion unit with a primary pinion and a secondary pinion. The actual planet gear as the primary pinion meshes with the sun gear and the first internally toothed ring gear, while the secondary pinion meshes with the second internally toothed ring gear. In an alternative version of this embodiment, the primary pinion meshes with an internally toothed ring gear that is formed on the output element while the secondary pinion meshes with the stationary internally toothed ring gear. The foregoing drive mechanism has the reduction ratio:

$$i = \frac{1 + N_1 N_4 / N_3 N_5}{1 - N_1 N_4 / N_2 N_3},$$

wherein $N_1$=number of teeth on first internal ring gear,
$N_2$=number of teeth on second internal ring gear,
$N_3$=number of teeth on secondary pinion,
$N_4$=number of teeth on primary pinion,
$N_5$=number of teeth on sun gear.
with $N_1 = N_3 + N_4 + N_5$, and
$N_2 = 2 \cdot N_4 + N_5$ Analogous to the embodiment with the harmonic drive mechanism, the values for $N_3$, $N_4$ and $N_5$ again have to be selected in accordance with the required reduction ratio, which is normally between 40:1 and 60:1.

In a further embodiment of the present invention, the planet gears are single pinions mounted on axles that are inclined relative to the central axis of the first and second internally toothed ring gears, so that one end of each planet gear meshes on a smaller diameter with the internal gear that has fewer teeth, while the other end of the planet gear meshes on a larger diameter with the internal gear that has a larger number of teeth. This arrangement has a reduction ratio of $$i = \frac{1 + N_1 / N_5}{1 + N_1 / N_2},$$

wherein $N_1$=number of teeth on stationary internal ring gear,
$N_2$=number of teeth on rotating internal ring gear,
$N_5$=number of teeth on sun gear.

Analogous to the previously described embodiments, the values for $N_1$, $N_2$ and $N_5$ again have to be selected in accordance with the required reduction ratio, which is normally between 40:1 and 60:1.

The drive mechanism of the present invention is used with particular advantage with the shift cylinders that are disclosed, e.g. in GB 2308874 and GB 2311829, which are hereby explicitly referenced and whose content will be expressly cited in the disclosure of the present invention. The electric motor and drive mechanism can in this case be installed coaxially inside the shift cylinder. Alternatively, the shift mechanism described above can be used with linear actuators such as, e.g., ball spindle actuators or gear rack actuators.

The innovative features that are considered characteristic of the invention are set forth in particular in the appended claims. The improved apparatus itself, however, both as to its construction and its mode of operation, together with additional features and advantages thereof, will be best understood from the following detailed description of certain presently preferred specific embodiments with reference to the accompanying drawings.

BRIEF DESCRIPTION OF THE DRAWINGS

The invention will be discussed in further detail based on examples that are illustrated in drawings, wherein.

DETAILED DESCRIPTION OF THE INVENTION

Figure 1:
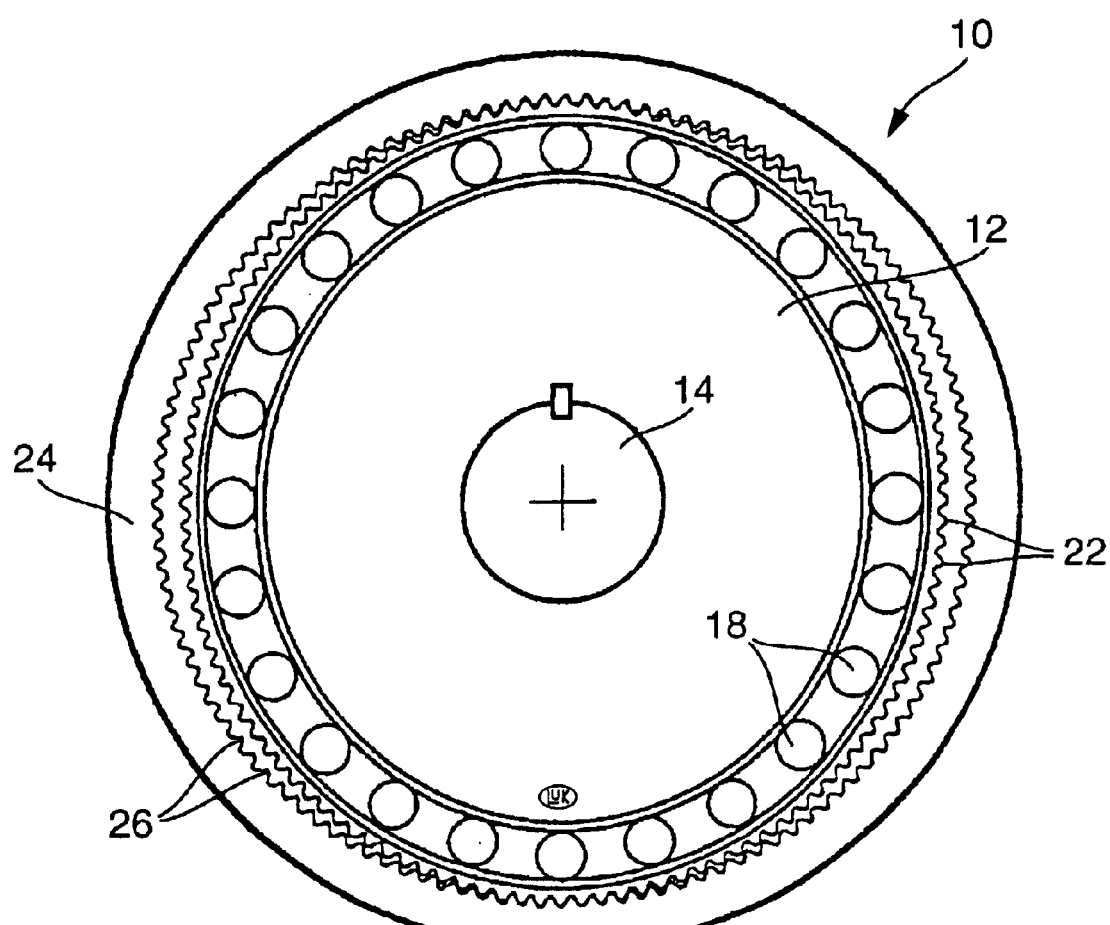
FIG. 1 represents a schematically drawn cross-section of a harmonic drive mechanism of the kind used in actuators of the present invention, FIG. 2 schematically illustrates the relative positions that the components of the harmonic drive mechanism take during one revolution.

As illustrated in FIG. 1, a harmonic drive mechanism 10 as used in the electric-motor actuator of the present invention has a wave generator 12 mounted on the rotor shaft 14 of the electric motor. The wave generator 12, which is keyed to the rotor shaft 14, has an elliptical shape and carries on its outer circumference a narrow flexible roller bearing 18.

A flexible spline gear 20 is seated on the outer race of the roller bearing 18. The flexible spline gear 20 is configured as a thin band that runs in a loop and has transverse external spline teeth 22.

A rigid circular spline ring 24 with internal spline teeth is mounted non-rotatably in a concentric position with the arrangement of the wave generator 12 and the flexible spline gear 20. The circular spline ring 24 has inward-facing, axially oriented spline teeth 26. The internal diameter of the circular spline ring 24 is equal to the major axis length of the ellipse formed by the wave generator 12 carrying the flexible spline gear 20, so that the spline teeth 22 of the flexible spline gear 20 engage the internal spline teeth of the circular spline ring 24 at diametrically opposite points on the major axis of the ellipse of the wave generator 12.

The minor axis of the elliptical wave generator 12 is short enough so that the spline teeth 22 in the area of the minor axis of the flexible spline gear 20 are radially separated from the spline teeth 26 of the circular spline ring 24.

The spline teeth 26 on the circular spline ring 24 are shaped to mesh with the spline teeth 22 of the flexible spline gear 20, but the flexible spline gear 20 has fewer spline teeth 22 than the number of spline teeth 26 on the circular spline ring 24.

When the rotor shaft 14 turns and moves the wave generator 12, the points where the flexible spline gear 20 meshes with the circular spline ring 24 move along the circular spline ring 24. Because the number of spline teeth 22 is smaller than the number of spline teeth 26, the rolling movement of the flexible spline gear 20 on the inside of the circular spline ring 24 has the effect that the flexible spline gear 20 revolves in the opposite direction of the rotation of the rotor shaft 14.

Figure 2A:
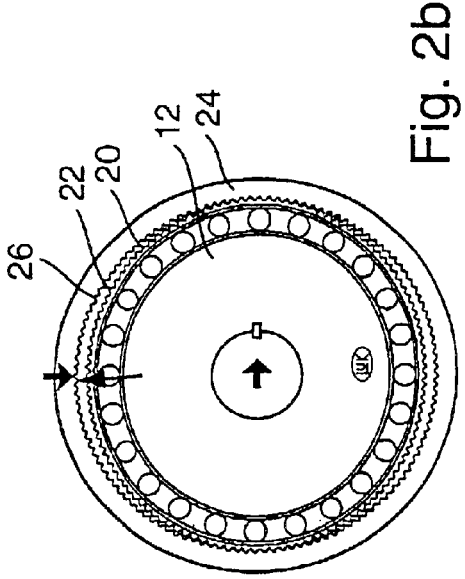
Figure 2B:
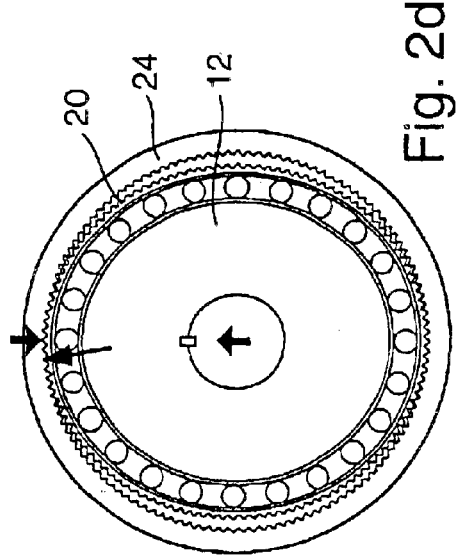
Figure 2C:
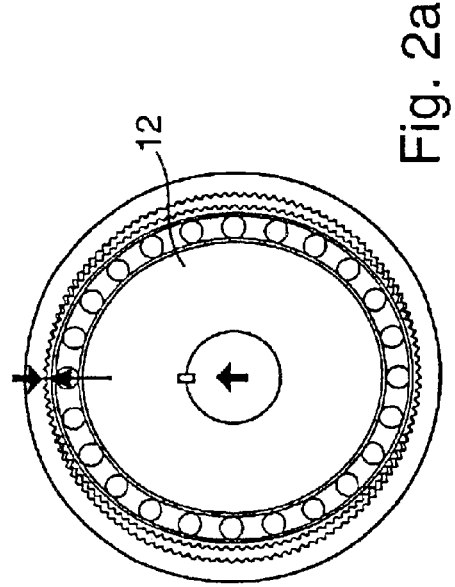
Figure 2D:
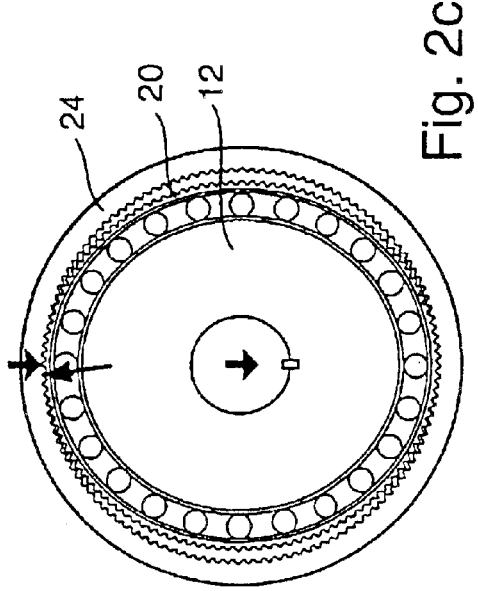

The function of the harmonic drive mechanism 10 is illustrated in FIGS. 2a to 2d for a full clockwise revolution of the wave generator 12. As shown in FIG. 2b, after a 90° turn of the wave generator 12 in the clockwise direction, the flexible spline gear 20 will have advanced in counterclockwise direction by one-fourth of the difference between the number of teeth 22 on the flexible spline gear 24 and the number of teeth 26 on the circular spline ring 24. For example, if the circular spline ring 24 has 102 teeth and the flexible spline gear 20 has 100 teeth, the flexible spline gear 20 will have moved by one-half of a tooth width in the counterclockwise direction relative to the stationary circular spline ring 24. FIG. 2c illustrates the situation after a 180° turn of the wave generator 12, where the flexible spline gear 20 will have moved by a full tooth width in the counterclockwise direction relative to the stationary circular spline ring 24. FIG. 2d, finally, shows the situation after a full 360° revolution of the wave generator 12, where the flexible spline gear 20 will have moved by two tooth widths in the counterclockwise direction relative to the stationary circular spline ring 24. The relative movement between the flexible spline gear 20 and the circular spline ring 24 is indicated in FIGS. 2a to 2d by the pair of arrows at the 12-o'clock position of the circular spline ring 24.

Thus, the harmonic drive mechanism 10 of the foregoing description has a reduction ratio of $$i = \frac{-n}{N},$$

wherein n stands for the difference between the number of teeth 22 on the flexible spline gear and the number of teeth 26 on the rigid circular spline ring. N represents the number of teeth 22 on the flexible spline gear. With 102 and 100 teeth, respectively, the ratio in this example is −50:1. The negative sign of the ratio i indicates that the drive mechanism reverses the sense of rotation between input and output. In other words, for 50 clockwise revolutions of the electric motor, the flexible spline gear 20 performs one counterclockwise revolution.

Figure 3:
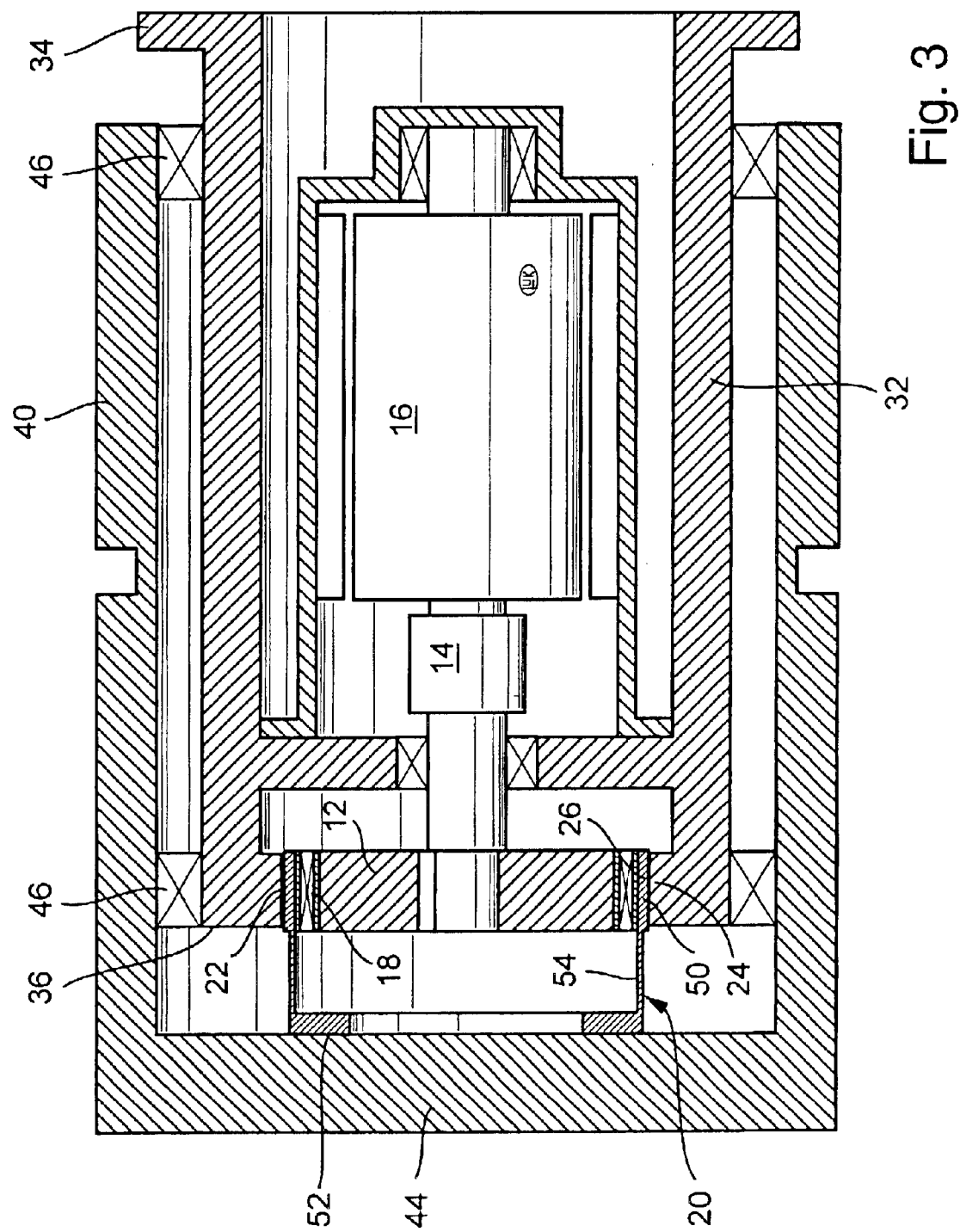
FIG. 3 shows a sectional side view of a shift cylinder actuator according to the present invention.

In the arrangement of FIG. 3, a contact-free electric motor 16 is installed in a cylindrical motor housing 32. A radially outward directed flange portion 34 at one end of the motor housing 32 is configured for mounting the motor housing, e.g., on a transmission housing by an appropriate fastening means such as screw bolts. A rotor shaft 14 of the electric motor 16 runs coaxial to the other end 36 of the motor housing. A shift cylinder 40 is rotatably mounted on the motor housing 32 through roller bearings 46.

An elliptical wave generator 12 is mounted on the rotor shaft 14 between the electric motor 16 and the closed end 44 of the shift cylinder 40. A flexible roller bearing 18 is mounted on the circumference of the wave generator 12, and a flexible spline gear 20 is seated on the outside of the roller bearing 18. The flexible spline gear 20 has the shape of a cup. The flexible ring-shaped portion 50 of the cup is mounted on the roller bearing 18 and has axially aligned external spline teeth 22. The bottom portion of the cup is configured as a hub 52 that is attached to the closed end 44 of the shift cylinder 40 by screw bolts or other suitable fasteners. A flexible cylindrical transition portion 54 extends coaxial to the rotor shaft 14 and connects the ring-shaped portion 50 to the hub 52 of the flexible spline gear.

A stationary internally toothed ring gear 24 is configured integrally with the motor housing 32, concentric with the wave generator 12 and the ring-shaped portion 50 of the flexible spline gear 20. As an alternative, the circular ring gear 24 could be made as a separate part and connected to the motor housing in a suitable manner. Along its internal circumference, the circular ring gear has spline teeth 26.

In the electrically powered actuator of FIG. 3, the rotation of the rotor shaft 14 causes the flexible spline gear 20 with the connected shift cylinder 40 to turn in the opposite direction. The rpm-ratio between the respective rotations of the rotor shaft 14 and the flexible spline gear 20 depends on the difference between the respective numbers of spline teeth 22 and 26 and is normally between −40:1 and −60:1.

Figure 4:
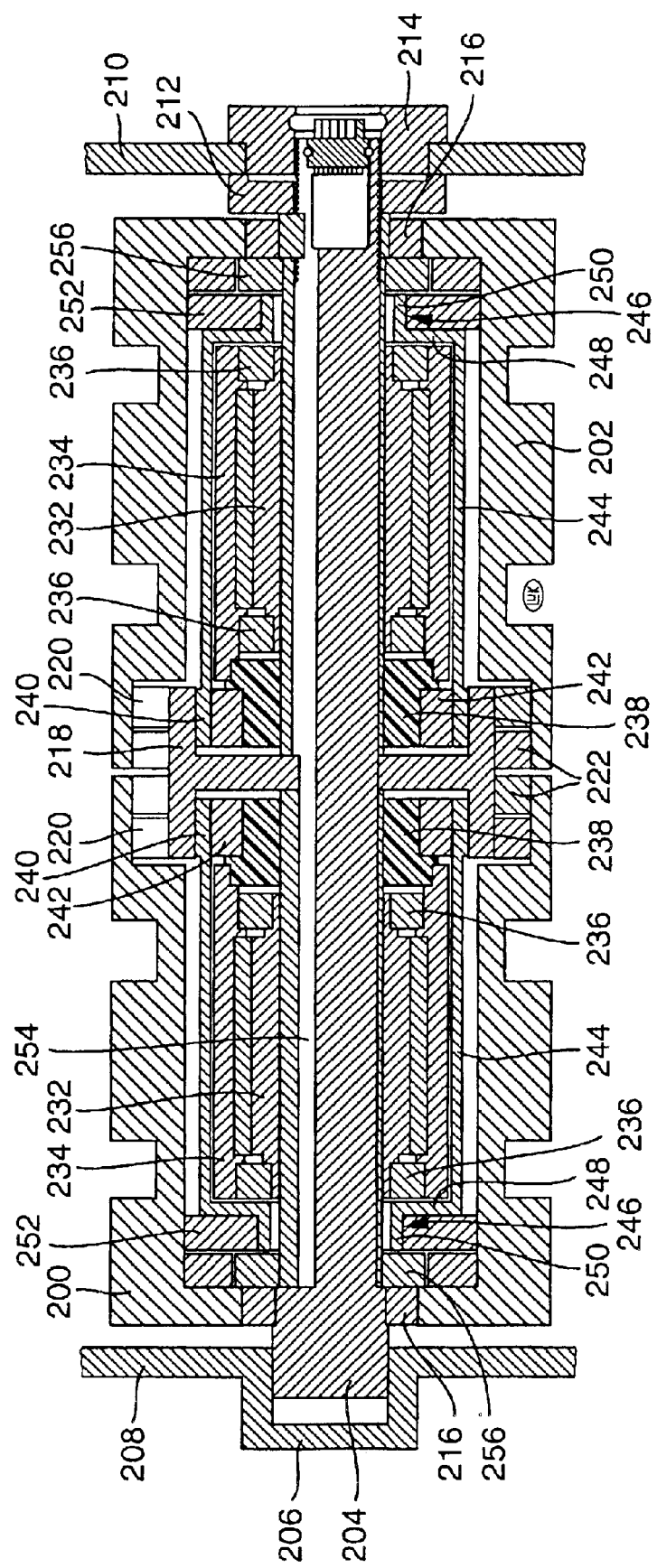
FIG. 4 shows a sectional side view of a dual-cylinder shift actuator according to the present invention, FIG. 5 schematically illustrates a drive mechanism that is used in clutch actuators, brake actuators or shift actuators of the present invention, FIG. 6 schematically illustrates an alternative drive mechanism that is used in clutch actuators, brake actuators or shift actuators of the present invention.

The dual-cylinder shift actuator in FIG. 4 has a first shift cylinder 200 and a second shift cylinder 202 arranged coaxially on a shaft 204. One end of the shaft 204 is seated in a recess 206 in the transmission housing 208, while the other end of the shaft 204 is fastened to a clutch housing 210 by means of screw nuts 212 and 214. The outer ends of the shift cylinders 200, 202 are closed off and mounted on the shaft 204 through sealed roller bearings 216. The inward-facing ends of the shift cylinders 200, 202 are mounted through roller bearings 220 on a ring-shaped element 218 that is locked in a non-rotatable position on the shaft 204. Seals 222 are arranged between an internal circumference of the shift cylinders 200, 202 and an external circumference of the ring-shaped element 218.

Permanent-magnet electric motors 230 are mounted on the shaft 204. The motors 230 are arranged coaxially inside the shift cylinders 200, 202. Each motor has a ring-shaped stator 232 mounted non-rotatably on the shaft 204, and a rotor 234 rotatably mounted on the stator 232 through sealed roller bearings 236. Elliptical wave generators 238 are attached and rotationally locked to the axially inward facing ends of the rotors 234.

A flexible spline gear 240 is arranged coaxially with each of the electric motors 230 between the internal circumference of the ring-shaped element 218 and a roller bearing 242 that is mounted on the external circumference of the wave generator 238. The external circumference of the flexible spline gear 240 and the internal circumference of the ring-shaped element 218 have spline teeth that mesh with each other in the areas at both ends of the major axis of the ellipsis of the wave generator 238. The flexible spline gear 240 has fewer spline teeth than the circular ring-shaped element 218.

The flexible spline gear 240 has a flexible transition portion 244 that is coaxial to the electric motor 230 and extends to a hub portion 246 inside the closed end of the shift cylinder 200, 202. The hub portion 246 has a radial flange portion 248 and a cylindrical portion 250 of smaller diameter that extends from the internal circumference of the flange portion 248 towards the closed end of the shift cylinder 200, 202. An elastomeric bushing 252 is compressively force-fitted between the outside of the cylindrical portion 250 of the hub 246 and the internal diameter of the shift cylinder 200, 202 so that the flexible spline gear 240 drives the shift cylinder 200, 202 through an axially and radially elastic connection.

The shaft 204 has an axial groove 254 that can serve as a conduit for the electrical connections to the motors 230 and also as a seat for keys that prevent rotation of the shaft 204, the ring-shaped element 218, and the stators 232.

Position sensors 256 are arranged at each of the shift cylinders 200, 202 to measure the angular movements of the shift cylinders 200, 202.

If one of the electric motors 230 in the actuator of FIG. 4 is energized, the revolving wave generator 238 causes the spline-engagement points between the flexible spline gear 240 and the ring-shaped element 218 to move in a circle. As a result of the unequal number of teeth on the flexible spline gear 240 and the ring-shaped element 218, the flexible spline gear 240 will perform a rotation and thereby drive the shift cylinder 200, 202.

The foregoing shift cylinder arrangements of FIG. 4 are particularly well suited for dual-clutch transmission systems of the kind described in the simultaneously pending UK patent applications GB 0028310 and GB 0103312, where for example the shift cylinder 200 can be arranged to control reverse, first, third and fifth gear sharing one clutch, while the shift cylinder 202 controls second, fourth and sixth gear sharing the other clutch.

Figure 5:
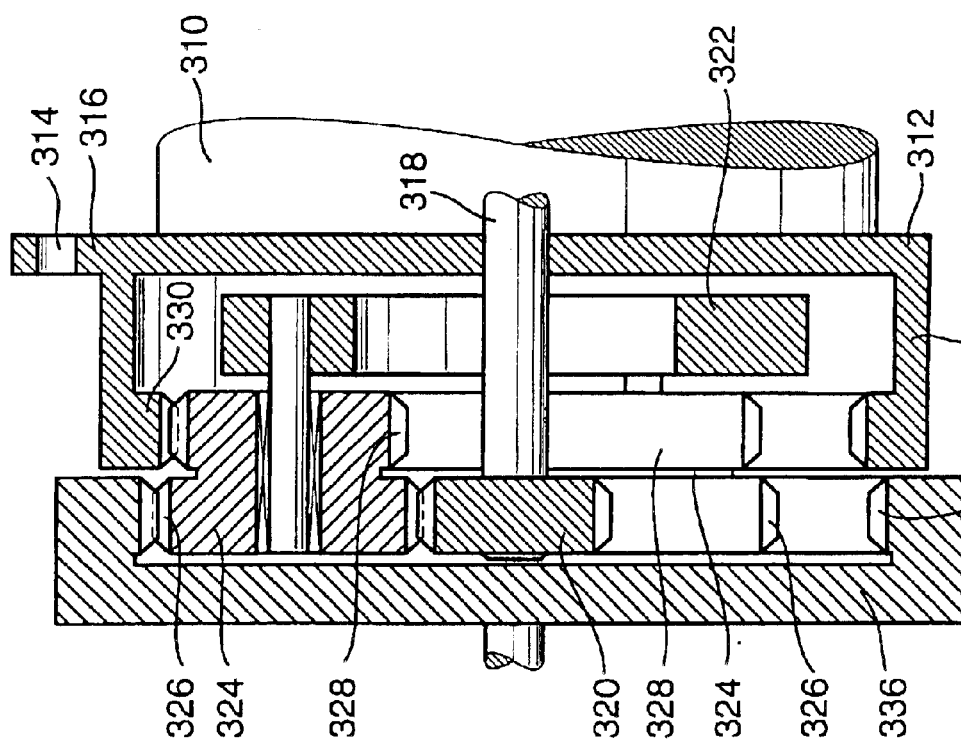

In the arrangement illustrated in FIG. 5, an electric motor 310 has a motor flange 312 with three lugs 316 arranged at an angular distance from each other with mounting holes 314 for bolting the motor 310 for example to a transmission housing of a motor vehicle. A rotor shaft 318 of the electric motor 310 extends through the motor flange 312.

A sun gear 320 of a planetary gear mechanism is mounted on and rotationally locked to the rotor shaft 318 of the electric motor 310. The number of teeth on the sun gear is $N_5$.

A planet carrier 322 is arranged coaxial to the rotor shaft 318. The axial position of the planet carrier is between the sun gear 320 and the outside wall of the motor flange 312. Three planet gears 324 are mounted rotatably on the planet carrier 322, equally spaced from each other along the circumference of the planet carrier 322. Each planet gear 324 is configured as a dual pinion with a primary pinion 326 meshing with the sun gear 320, and a secondary pinion 328. The primary and secondary pinions 326, 328 of each planet gear 324 are connected or formed as one integral part so that they rotate together. The number of teeth on the primary pinion 326 is $N_4$, and the number of teeth on the secondary pinion is $N_3$.

The secondary pinion 328 meshes with a stationary internally toothed ring gear 330 that is formed on a ring-shaped flange 332 extending from the outside of the motor flange 312 coaxial to the rotor shaft 318 and radially surrounding the planet carrier 322. The stationary internal gear 330 has $N_1$ teeth. The numbers of teeth have to be correlated according to the equation $N_1 = N_3 + N_4 + N_5$.

The primary pinion 326 also meshes with an internally toothed ring gear 334 formed on an output element 336 which is arranged coaxial to the rotor shaft 318. The internal gear 334 has $N_2$ teeth, where the numbers of teeth have to satisfy the equation $N_2 = 2 \times N_4 + N_5$.

The reduction ratio for the planetary gear mechanism of the foregoing description is $$i = \frac{1 + N_1 N_4 / N_3 N_5}{1 - N_1 N_4 / N_2 N_3}$$

The values for $N_3$, $N_4$ and $N_5$ are selected so that a suitable reduction ratio is achieved, preferably between 40:1 and 60:1. As shown in the following Table 1, reduction ratios of the order of 50:1 can be achieved if the sun gear 320 and the primary and secondary pinions 326, 328 are of approximately equal size, and the number of teeth differs by about 10% between the primary pinion 326 and the secondary pinion 328. A change in the size of the sun gear has a comparatively smaller effect on the reduction ratio. With a larger or smaller difference between the respective numbers of teeth on the primary and secondary pinions, the result can be compensated by choosing a significantly different number of teeth on the sun gear 320.

TABLE 1

| Number of teeth | | | | | Reduction |
|---|---|---|---|---|---|
| N1 | N2 | N3 | N4 | N5 | ratio |
| 58 | 56 | 20 | 18 | 20 | 53.20 |
| 59 | 57 | 20 | 18 | 21 | 51.57 |
| 60 | 58 | 20 | 18 | 22 | 50.09 |
| 116 | 112 | 40 | 36 | 40 | 53.20 |
| 116 | 120 | 36 | 40 | 40 | −57.00* |
| 139 | 138 | 20 | 19 | 100 | 53.82 |
| 96 | 90 | 40 | 34 | 22 | 50.45 |
| 86 | 78 | 40 | 32 | 14 | 50.14 |
| 80 | 70 | 40 | 30 | 10 | 49 |

*a negative value indicates that the output element turns in the opposite direction of the motor shaft.

Figure 6:
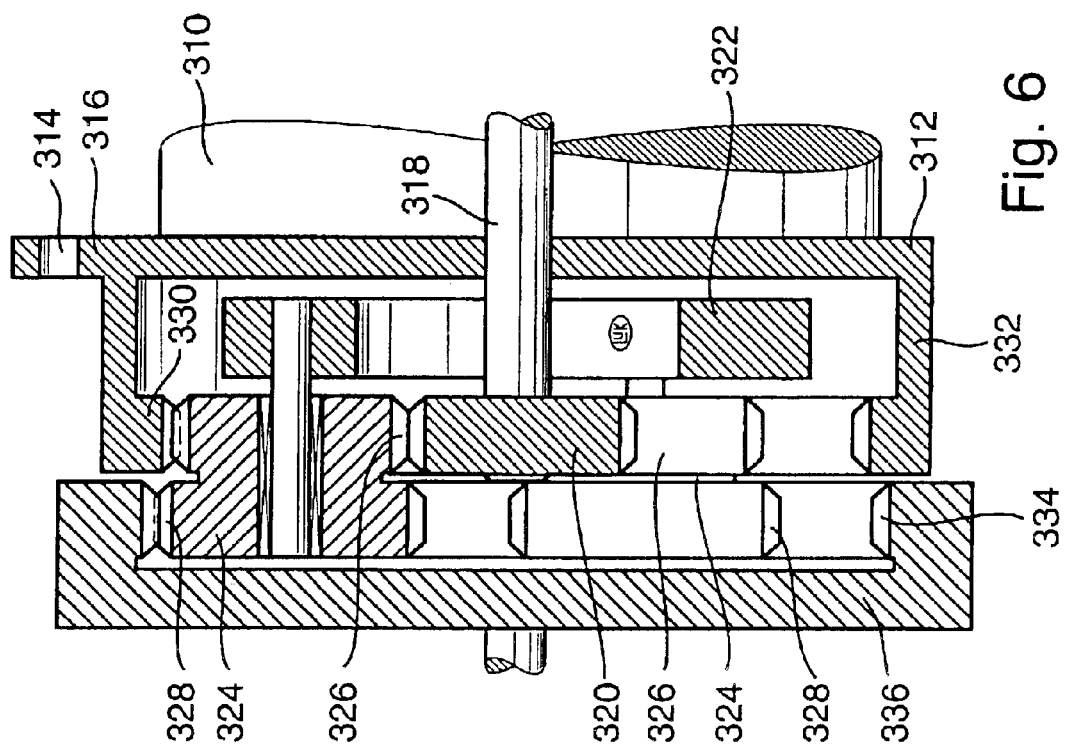

In an alternative version of a planetary mechanism as shown in FIG. 6, the primary pinion 326 meshes with the stationary internal tooth profile 330, while the secondary pinion 328 meshes with the internal tooth profile 334 of the output element 336.

The latter planetary mechanism has a reduction ratio of $$i = \frac{1 + N_1 / N_5}{1 - N_1 N_4 / N_2 N_3}$$

The values for $N_3$, $N_4$ and $N_5$ are again selected so that a suitable transmission ratio is achieved, preferably in the order of magnitude between 40:1 and 60:1 as in the following examples in Table 2.

TABLE 2

| Number of teeth | Reduction |

| N1 | N2 | N3 | N4 | N5 | ratio |
|----|----|----|----|----|-------|
| 60 | 58 | 20 | 18 | 20 | 58.00 |
| 53 | 50 | 20 | 17 | 13 | 51.28 |
| 98 | 90 | 40 | 32 | 18 | 50.00 |
| 56 | 58 | 18 | 20 | 20 | −52.20* |
| 88 | 94 | 34 | 40 | 20 | −53.27* |
| 140 | 139 | 20 | 19 | 100 | 55.60 |

*a negative value indicates that the output element turns in the opposite direction of the motor shaft.

Figure 7:
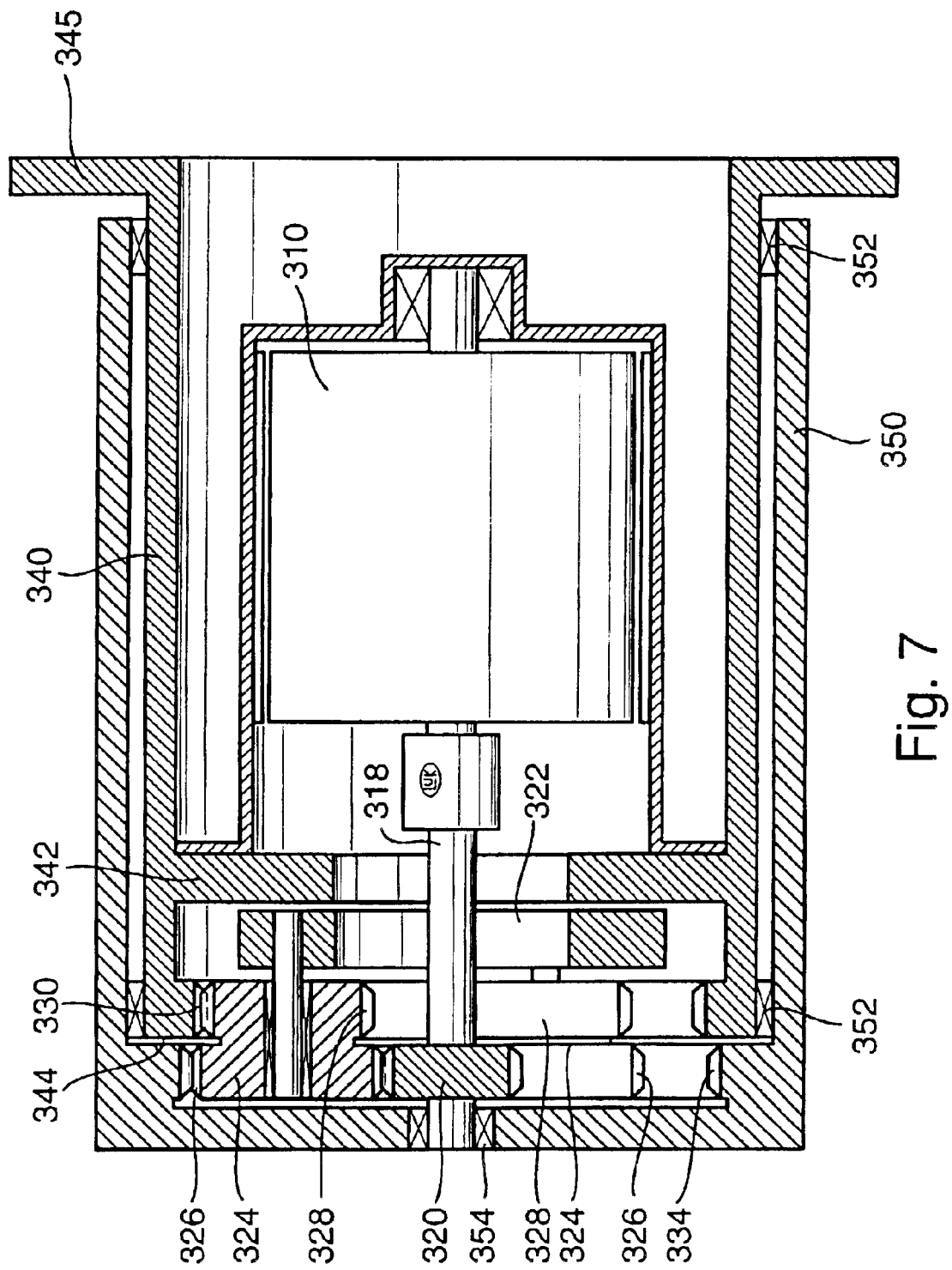
FIG. 7 shows a sectional side view of a shift cylinder actuator according to the present invention.

FIG. 7 illustrates a shift cylinder arrangement for a gear-shifting mechanism of a motor vehicle in which the planetary mechanism of the foregoing description is used. The electric motor 310 is mounted inside a cylindrical housing 340, attached to an internal flange 342 near one end 344 of the housing 340. An external flange 345 at the other end of the housing 340 is configured so that it can be fastened, e.g., to a transmission housing. The stationary internal tooth profile 330 is arranged at the end 344 of the housing 340.

The sun gear 320 is mounted on the rotor shaft 318 of the electric motor 310.

The planet carrier 322 is arranged coaxial to the rotor shaft 318 at an axial location between the sun gear 320 and the internal flange 342. Three planet gears are mounted rotatably on the planet carrier 322. The primary pinion 326 of each planet gear 324 meshes with the sun gear 320 and with an internal tooth profile 334 that is formed on the internal circumference of a shift cylinder 350. The secondary pinion 328 of each planet gear 324 meshes with a stationary internal tooth profile 330 that is formed on the internal circumference of the housing 340 next to the end 344.

The shift cylinder 350 is rotatably supported by roller bearings 352 on the external circumference of the cylindrical housing 340. The shift cylinder 350 is closed off at the end that faces away from the flange 345 of the housing 340. The closed end of the shift cylinder 350 is rotatably seated on the rotor shaft 318 of the electric motor 310 through a roller bearing 354.

When the electric motor 310 is energized, its rotor shaft 318 drives the sun gear 320 which, in turn, drives the planet gears 324, so that the secondary pinions 328 are rolling along the stationary internal tooth profile 330. The primary pinions through their engagement in the internal tooth profile 334 cause the shift cylinder 350 to revolve. The rotary reduction ratio from the rotor shaft 318 to the shift cylinder 350 is normally of the order of 40:1 to 60:1.

Figure 8:
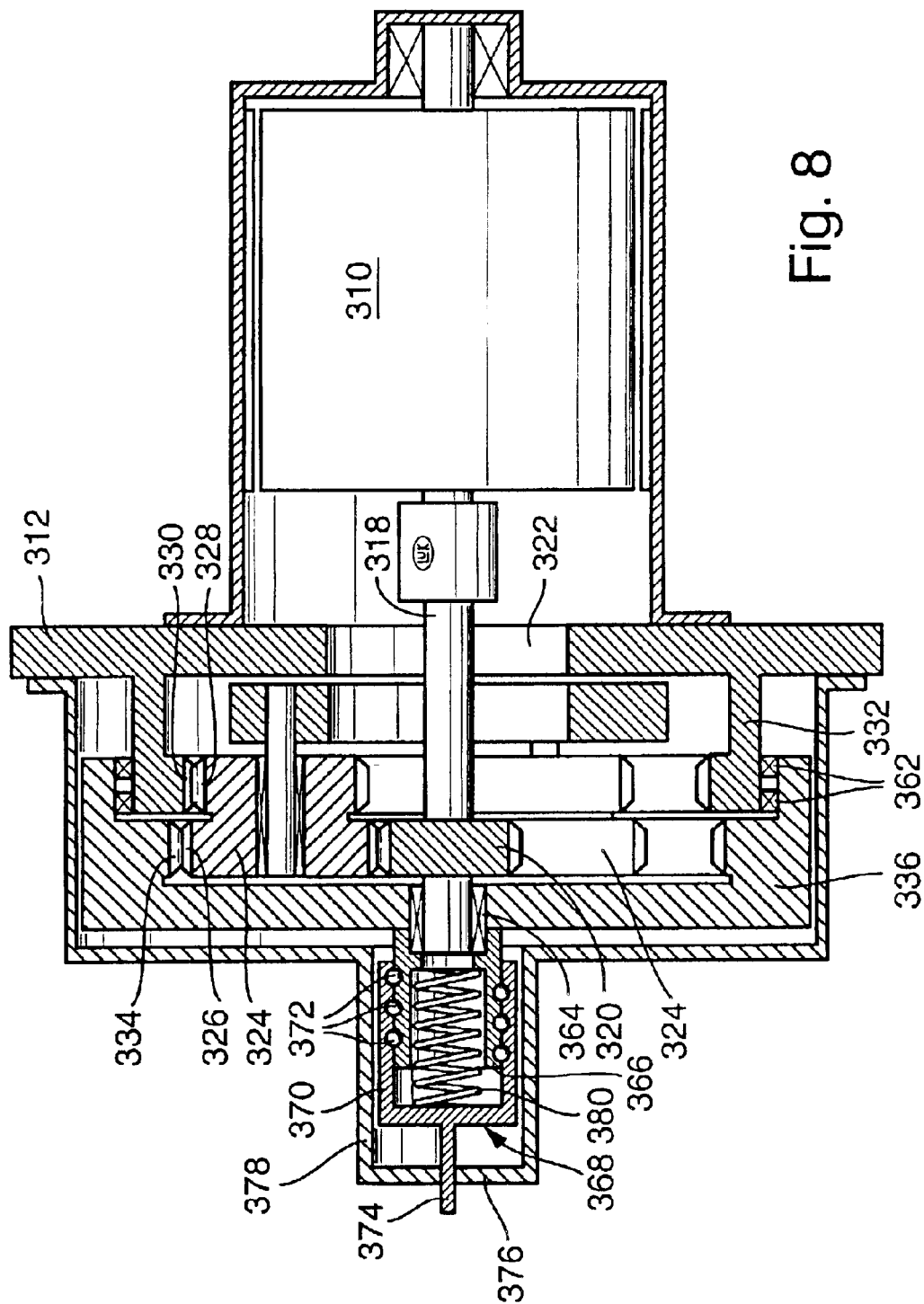
FIG. 8 shows a sectional side view of a ball spindle actuator according to the present invention.

The linear drive mechanism shown in FIG. 8 is normally used to actuate the piston of a hydraulic master cylinder of the kind disclosed in GB 2325036, GB 2313885, and GB 2309761. The pressure generated by the master cylinder is transmitted to a slave cylinder that actuates the engagement and disengagement of a clutch. Linear actuators of this kind offer an alternative solution for actuating the engagement and disengagement of a clutch, or for setting a transmission ratio by means of a suitable mechanical linkage or mechanical cable drive.

In the linear actuator of FIG. 8, the rotary output element 336 of the planetary mechanism is rotatably supported by roller bearings 362 on the ring-shaped flange 332 and also by a roller bearing 364 on the rotor shaft 318.

The inner, externally threaded part 366 of a revolving ball spindle actuator 368 is connected to or formed on the rotary output element 336 at the end that faces away from the motor 310. The outer, internally threaded part 370 of the spindle actuator 368 is seated coaxially on the inner part with an arrangement of roller balls interposed between the inner part 366 and the outer part 377. The outer part 370 of the ball spindle actuator ends in a plunger rod 374 that passes through an end wall 376 of the housing 378. The plunger rod 374 is movable in the axial direction of the housing 378 but is constrained from rotating relative to latter. The plunger rod 374 can be connected directly or indirectly to the piston of a hydraulic master cylinder. In this arrangement, the rotation of the output element 336 that occurs as a result of energizing the electric motor 310 is converted to a linear axial movement of the plunger rod 374.

A compensator spring 380 is compressed between the rotary output element 336 and the outer part 370, exerting a biasing force on the outer part 370 in the direction towards the end wall 376 of the housing 378. When the actuator of FIG. 8 is used to control a clutch, the compensator spring 380 works against the reactive force of the clutch spring. In a normal arrangement, the compensator spring 380 is in its most compressed state when the clutch is in the fully engaged condition and the ball spindle actuator 368 is at the fully retracted end of its movement range in the direction away from the closed-off part of the housing 378. Thus, the force exerted by the compensator spring 380 assists the electric motor 310 in driving the ball spindle mechanism 368 to disengage the clutch. As a result, this clutch actuator can be equipped with a smaller, less powerful electric motor 310 than would be required without the compensator spring 380.

Figure 9:
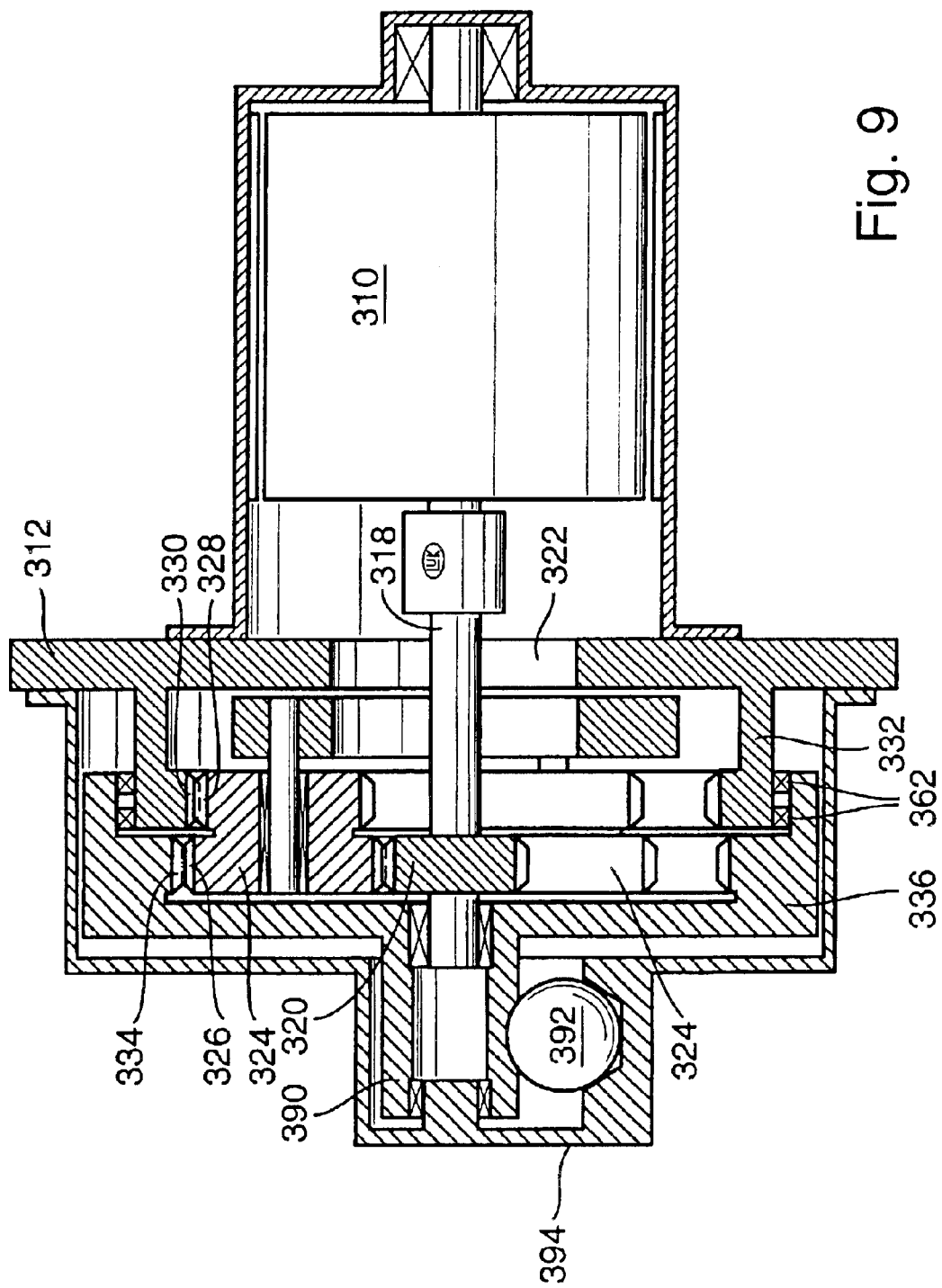
FIG. 9 shows a sectional side view of a gear rack actuator according to the present invention.

The actuator of FIG. 9 is analogous to the actuator or FIG. 8, except that the output element 336 ends in a pinion gear 390 which meshes with the linear tooth profile of a rack 392 extending in the transverse direction of the housing 394.

Figure 10:
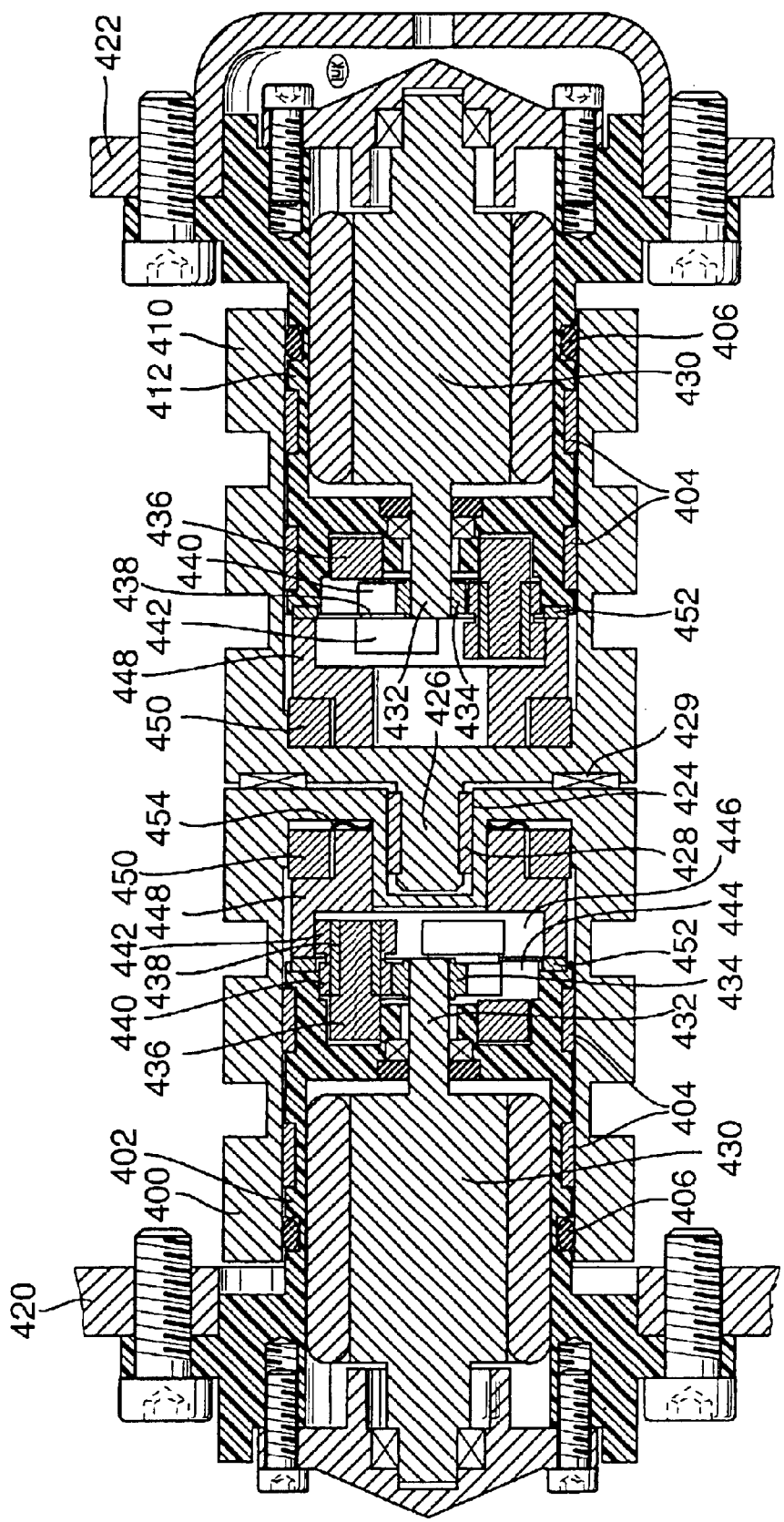
FIG. 10 shows a sectional side view of a dual-cylinder shift actuator according to the present invention.

FIG. 10 illustrates a dual-cylinder shift actuator arrangement. A first shift cylinder 400, closed off at one end, is rotatably supported by roller bearings 404 on the circumference of a first cylindrical motor housing 402. A seal 406 is arranged next to the open end of the shift cylinder 400 between the internal circumference of the shift cylinder 400 and the external circumference of the motor housing 402.

A second shift cylinder 410 is rotatably supported on a second cylindrical motor housing 412, analogous to the arrangement of the first shift cylinder 400.

The first and second motor housings 402, 412 are configured to be installed in coaxial alignment. One motor housing is attached, e.g., to a transmission housing 420 and the other motor housing is attached to a clutch housing 422, so that the dual cylinder arrangement extends inside the transmission housing between the two attachment locations.

The closed ends of the shift cylinders 400, 410 that face each other are configured, respectively, with a recess 424 and an axle peg 426, with the axle peg being received in a roller bearing 428 in the recess 424 in the assembled state of the dual cylinder arrangement 400, 410. An axial thrust bearing 429 is interposed between the adjacent end surfaces of the first and second shift cylinders 400, 410.

The motor housings 402, 412 contain electric motors 430 that are coaxial to their cylindrical housings. Each of the electric motors 430 has a rotor shaft 432 on which a sun gear 434 is mounted so that it shares the rotation of the respective rotor shaft 432. A planet carrier 436 surrounds each of the rotor shafts 432, with three planet gears 438 arranged at equal angular intervals around the planet carrier. Each planet gear 438 is configured as a dual pinion unit with a primary pinion 440 and a secondary pinion 442. The primary pinion 440 and the secondary pinion 442 have different numbers of teeth.

Each primary pinion 440 meshes with a sun gear 434 and a fixed internal tooth profile 444 formed on the internal circumference of the respective motor housing 402, 412. Each secondary pinion 442 meshes with an internal tooth profile 446 formed on an output ring gear 448.

The output ring gears 448 are connected to the shift cylinders 400, 410 through elastic bushings 450 that are press-fit between the output ring gears 448 and the shift cylinders 400, 410. The elastic bushings provide a degree of radial elasticity in the coupling between the shift cylinders 400, 410 and the rotary drive mechanisms.

Axial thrust bearings 452 are arranged between the output ring gears 448 and the ends of the respective motor housings 402, 412. A compression spring 454 is interposed between the closed end of the shift cylinder 400 and the associated output ring gear 448 to exert an axial biasing force on the thrust bearings 452.

The dual cylinder arrangement of the foregoing description provides a compact solution for a mechanism that fits between the transmission housing and the clutch housing of a motor vehicle. The electric motors and drive mechanisms have seals 406 to keep out the transmission fluid.

Furthermore, there can be position sensors arranged in the dual-cylinder shift mechanism to measure the angular movements of the shift cylinders 400, 410 relative to the motor housings 402, 412.

Figure 11:
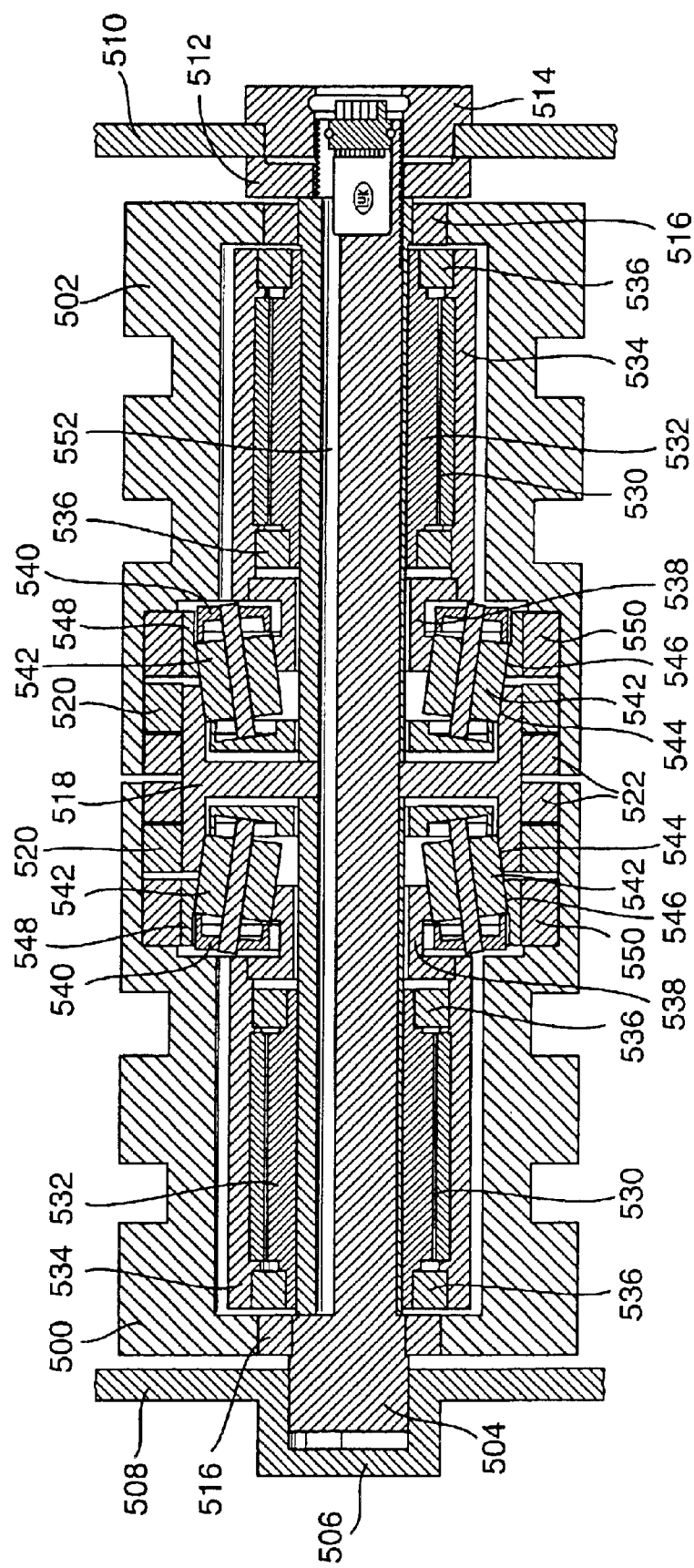
FIG. 11 shows a sectional side view of an alternative dual-cylinder shift actuator according to the present invention.

The dual-cylinder shift actuator of FIG. 11 has a first shift cylinder 500 and a second shift cylinder 502 in a coaxial arrangement on a shaft 504. One end of the shaft 504 is seated in a recess 506 of the transmission housing 508, while the other end of the shaft 504 is attached to a clutch housing 510 by means of screw nuts 512 and 514. The outward-facing ends of the shift cylinders 500, 502 are closed off and rotatably supported on the shaft 504 on sealed roller bearings 516. The inward-facing ends of the shift cylinders 500, 502 are supported by roller bearings 520 that are mounted on a ring-shaped element 518 which is non-rotatably attached to the center of the shaft 504. Seals 522 are interposed between an internal diameter of each shift cylinder 500, 502 and an external diameter of the ring-shaped element 518.

Permanent-magnet electric motors 530 are mounted on the shaft 504, extending coaxially inside the shift cylinders 500, 502 and adjoining the closed-off ends of the shift cylinders 500, 502. Each motor 530 has a ring-shaped stator 532 mounted non-rotatably on the shaft 532, and a rotor 534 rotatably supported on sealed roller bearings 536 on the stator 532. Ring-shaped sun gears 538 are attached to the inward-facing ends of the rotors 534, so that each sun gear 538 rotates together with the respective rotor 534.

A planet carrier 540 with four planet gears 542 set at equal angular intervals is arranged at each of the sun gears 538. The rotational axes of the planet gears 542 are set at an angle relative to the axis of the shaft 504, so that the outer ends of the planet gears 542, which face away from the ring-shaped element 518, run on a larger radius from the shaft 504 than the inner ends of the planet gears. The teeth on the sun gear are inclined to match the angle of the planet gears 542 and to mesh with the planet gears.

One side of each planet gear 542 also meshes with an internal tooth profile 544 that is formed on an internal circumference of the ring-shaped element 518, while the other side of the planet gear 542 meshes with an internal tooth profile 546 on an output ring gear 548. The teeth on the internal tooth profiles 544 and 546 are inclined to match the angle of the planet gears 542. The internal tooth profiles 544 and 546 are distanced from each other in the axial direction of the shaft 504, so that the planet gears 542 mesh with the tooth profiles 544 at a shorter radial distance from the axis of rotation than with the tooth profiles 546. Also, the tooth profile 544 with the shorter radius has a smaller number of teeth than the tooth profile 546. Each of the output ring gears 548 is connected to one of the shift cylinders 500, 502 through an elastic bushing that is compressively fitted between an internal circumference of the shift cylinder 500, 502 and an external circumference of the output ring gear 548, so that the actuator drive mechanism has a certain degree of elasticity.

The shaft 504 has an axial groove 552 that can be used as a conduit for the electrical connections to the motors 530 and also as a key groove to receive key blocks that keep the shaft 504, the ring-shaped element 518 and the stators 532 from rotating relative to each other.

Analogous to the preceding embodiments, the dual-cylinder shift mechanism of FIG. 11 can also have position sensors to measure the angular movements of the shift cylinders 500, 502.

When the electric motors 530 of the actuator of FIG. 11 are energized, they turn the sun gears 538 and thereby cause the planet gears 542 to roll on the stationary internal tooth profiles 544. Because the internal tooth profiles 544 and 546 have different numbers of teeth, the rolling movement of a planet gear 542 again causes a rotation of the associated output ring gear 548 with the connected shift cylinder 500, 502.

The gear-drive mechanism of the foregoing description has a reduction ratio of $$i = \frac{1 + N_1/N_5}{1 - N_1/N_2},$$

wherein $N_1$=number of teeth on stationary internal tooth profile 544, $N_2$=number of teeth on internal tooth profile 546 of output ring gear 548, $N_5$=number of teeth on sun gear 538.

In a typical example, the stationary internal tooth profile 544 has $N_1$=60 teeth, the internal tooth profile 546 on the output ring gear 548 has $N_2$=65 teeth, and the sun gear 538 has $N_5$=20 teeth. The reduction ratio according to the foregoing equation is 52:1.

The dual-cylinder arrangements described in the context of FIGS. 10 and 11 are particularly well suited for dual-clutch transmission systems of the kind described in the simultaneously pending UK Patent Applications GB 0028310 and GB 0103312, which are hereby explicitly referenced and whose content will be expressly cited in the disclosure of the present invention. With the arrangements disclosed therein, the shift cylinder 500 can, e.g., be configured to control first, third, fifth and reverse gear sharing one clutch, while the shift cylinder 510 controls second, fourth and sixth gear sharing the other clutch.

A variety of modifications are possible without leaving the scope encompassed by the invention. For example in the ball spindle mechanism of FIG. 8, the output function (i.e., the linear movement) of the actuator mechanism can be performed by the externally threaded part of the mechanism rather than the internally threaded part.

Figure 12:
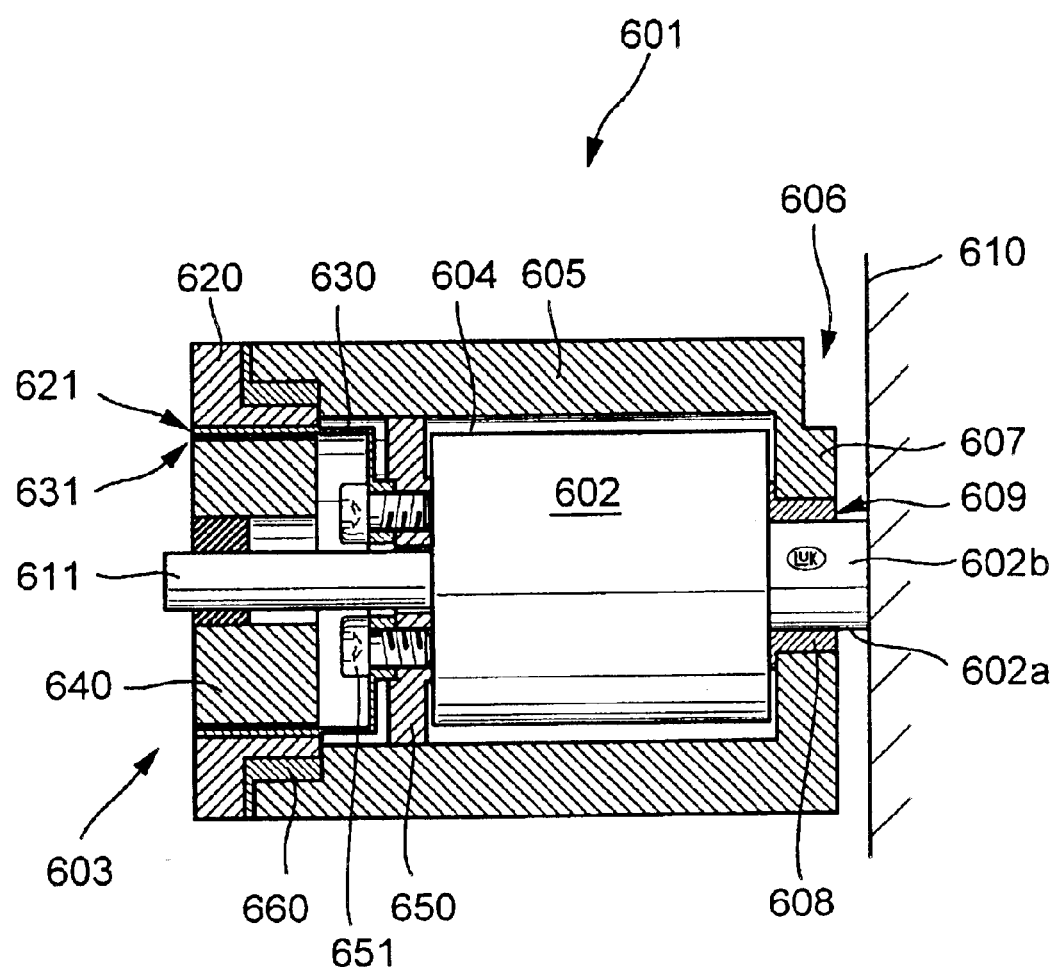
FIG. 12 illustrates a shift cylinder actuator with an integrally incorporated motor.

The shift cylinder 601 represented in FIG. 12 has a motor 602, for example an electric motor, as well as a reduction gearbox 603 arranged at least partially inside a cavity 604. To provide the cavity 604 inside the shift cylinder 601, the latter is configured as a hollow cylinder over at least a part of its axial length. At least the hollow part of the cylinder is configured as a cylinder shell 605 with external grooves 606 and/or projections that cooperate with elements of the transmission so that a rotary movement of the shift cylinder actuates an element of the transmission or a clutch.

An end portion of the cylinder shell has a collar 607 extending radially inwards, with a central opening 609 to receive a bearing 608. The bearing 608 functions simultaneously as a radial bearing and as an axial thrust bearing.

One of the parts of the motor 602, e.g., the motor housing 602a, is connected to a part of the transmission 610, for example to the transmission housing of a motor vehicle, through an attachment that constrains the motor housing 602a from rotating. The motor housing 602a has a portion 602b that protrudes through the opening 609 in the neck of the shift cylinder 601 and connects to the transmission housing.

While the motor is mounted in a non-rotating condition on the transmission housing or on a mounting base in general, the shift cylinder is rotatably supported on the motor housing by means of the bearing 608.

The shift cylinder 601 is driven by the electric motor 602 whose rotor shaft 611 drives the cylinder shell 605 of the shift cylinder 601 through an interposed reduction gearbox 603. To perform this function, the rotor shaft 611 is coupled to a part of the reduction gearbox 603. The reduction gearbox 603 in the illustrated embodiment is configured as a so-called harmonic drive mechanism of the kind disclosed, e.g., in DE 199 27 957. If this kind of reduction gearbox is used, the rotor shaft 611 of the motor is rotationally coupled to the wave generator 640 through a form-locking connection, for example a plug insert. The outer, stationary ring gear of the harmonic drive arrangement and the inner, flexible spline gear differ for example by two teeth, with the flexible spline gear having, e.g., 100 teeth and the rigid ring gear having 102 teeth, so that the reduction ratio is −50:1.

The harmonic drive mechanism consists substantially of a preferably stationary ring gear 620 with an internal tooth profile 621, a flexible spline gear 630 that is preferably cup-shaped and carries an external tooth profile 631, and a wave generator 640 with a non-circular profile shape. The rotation of the wave generator 640 causes the flexible spline gear 630 to revolve inside the stationary ring gear 620 even though there is no form-fitting or friction-based connection between the wave generator and the flexible spline gear 630. To the contrary, there is normally a bearing element interposed between the two elements. A functional description of the harmonic drive concept may be found in DE 199 27 957 and EP 0 501 522, whose content is hereby expressly included in the disclosure of the present application.

At one axial end, the flexible spline gear 630 is stepped down to a narrower radius. A radial collar 632 at the step is solidly connected to a rotatable driving plate 650 by means of fasteners 651. The fasteners can be form-locking connectors such as screws, rivets, or similar fasteners.

The radially inner portion of the driving plate 650 is solidly connected to the flexible spline gear, while the radially outer portion is connected to the cylinder shell 605 of the shift cylinder, so that the shift cylinder is driven by the flexible spline gear. The driving plate 650 can be configured as a rigid element or it can have a degree of elasticity that allows a small amount of relative angular movement between the portion that connects with the flexible spline gear and the portion that connects with the cylinder. To achieve the elastic property, the driving plate can be configured, e.g., as an aggregate of several parts with at least two coaxial disks and at least one energy storing-device such as a rubber element or a spring interposed between the disks. In this embodiment, one of the disks can be connected to the flexible spline gear, while another disk is connected to the cylinder shell of the shift cylinder. In this case, the torque transfer from the flexible spline gear to the cylinder shell 605 occurs through the interposed elastic elements.

The rigid ring gear 620 preferably has a non-rotating, fixed connection to a housing portion of the drive mechanism. A bearing 660 is arranged between the rigid ring gear 620 and the rotatably supported cylinder shell 605 of the shift cylinder 601. The bearing 660 can function simultaneously as a radial bearing and as an axial thrust bearing. To perform both functions, the bearing 660 has an axial part and a radial part, both of which can be configured either as sliding bearings or roller bearings.

Figure 13:
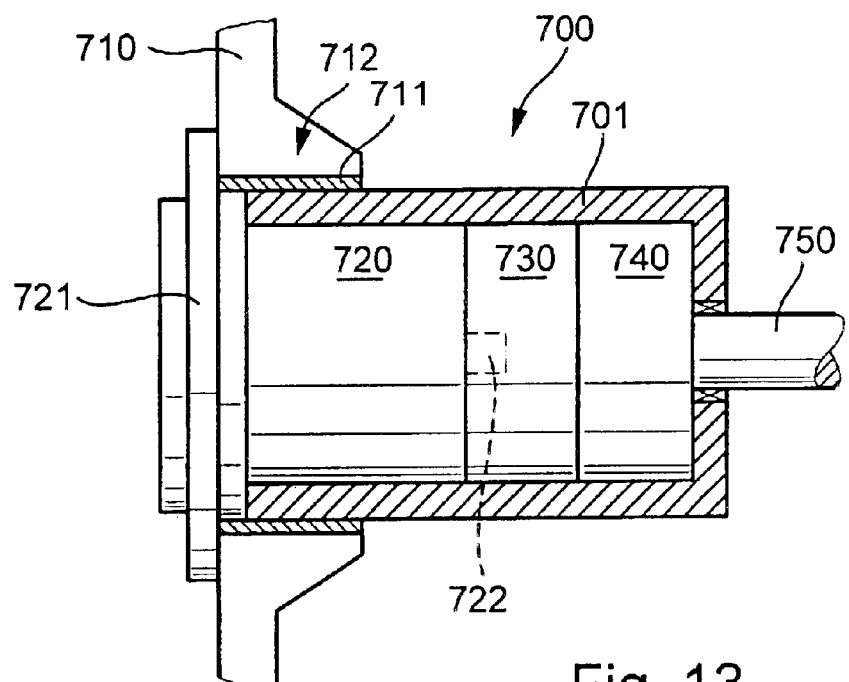
FIG. 13 represents a schematic view of a shift cylinder actuator according to the invention.

FIG. 13 illustrates an embodiment of a shift cylinder actuator 700 for the actuation of transmission-shifting elements, e.g., to change gears. The arrangement of the components of the shift cylinder actuator 700 is shown only schematically. The cylindrical shell 701 of the shift cylinder actuator 700 is rotatably held in a receiving socket 712 of the transmission housing 710 of the vehicle transmission. The receiving socket 712 has the shape of a collar that projects from the transmission housing and receives the bearing 711. The electric motor 720 is seated inside the hollow shell 701, attached to a mounting plate 721 which, in turn, can be connected to the transmission housing 710. The mounting plate 721 has a larger radius than the cylinder shell 701 and can, e.g., be screwed onto the housing 710, so that the motor is constrained from rotating relative to the transmission housing 710. The rotor shaft 722 of the motor 720 drives an element of a reduction gearbox 730. The output element of the reduction gearbox 730 is operatively connected to a driving element 740 that drives the cylinder shell 701. There is further a shaft connected with the shift cylinder, where a sensor may be arranged to detect, e.g., the angular position of the shift cylinder. The placement of a sensor at the axial end of the shift cylinder represents an optional solution. A sensor could also be integrated in the electric motor, e.g., an incremental angular position sensor to detect the angular position of the shift cylinder.

Figure 14:
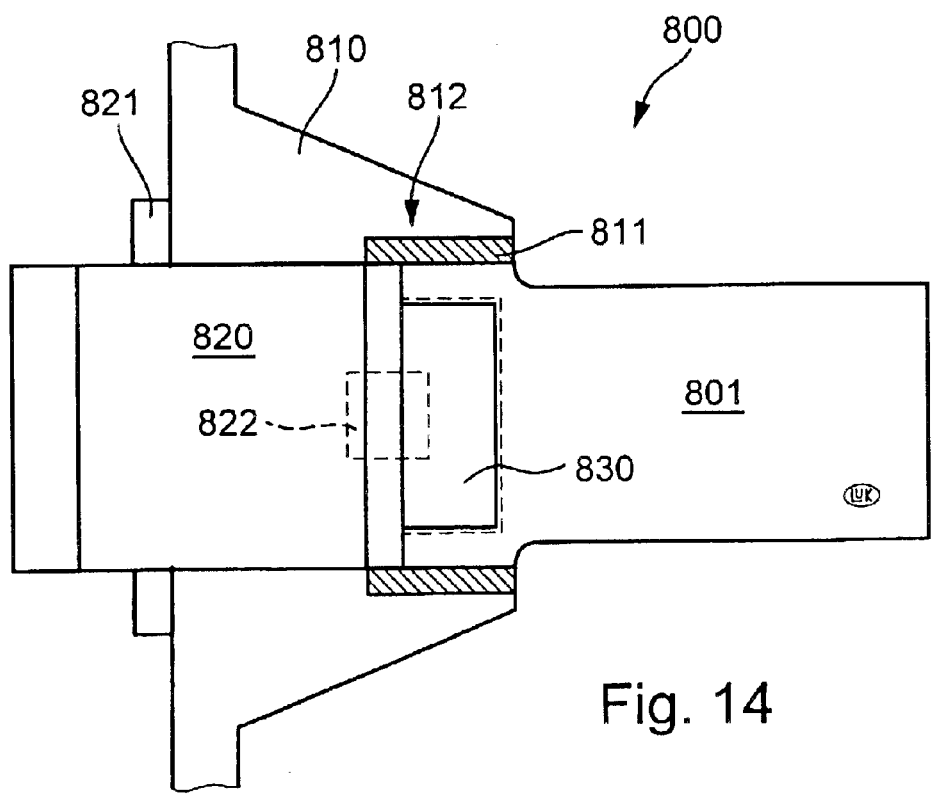
FIG. 14 represents a schematic view of a shift cylinder actuator according to the invention.

FIG. 14 illustrates an embodiment of a shift cylinder actuator 800 for the actuation of transmission-shifting elements, e.g., to change gears. The arrangement of the components of the shift cylinder 800 is shown only schematically. The cylinder of the cylinder actuator 800 is rotatably held in a receiving socket 812 of the transmission housing 810 of the vehicle transmission. The receiving socket 812 has the shape of a collar that projects from the transmission housing and receives the bearing 811. The electric motor 820 is seated in a receiving opening of the transmission housing and attached to the transmission housing through fastener means 821. In the embodiment of FIG. 14, the electric motor 820 is not arranged inside the shift cylinder, but the motor and the shift cylinder are aligned next to each other along a common axis. The rotor shaft 822 of the motor 820 drives an element of a reduction gearbox 830. The output element of the reduction gearbox 830 is operatively connected to a driving element that drives the cylinder 801. The shift cylinder of FIG. 14 is conducive to a particularly slender shape of the shift cylinder actuator, because of the in-line arrangement of the electric motor. This can be of considerable advantage when there are certain spatial constraints. At least the reduction gearbox is arranged partially or entirely in a recess of the shift cylinder. An elastic element can be inserted between the output element of gearbox 830 and the shift cylinder 801 to allow a degree of flexible relative rotation in the torque flow between the output element of the gearbox and the shift cylinder.

Figure 15:
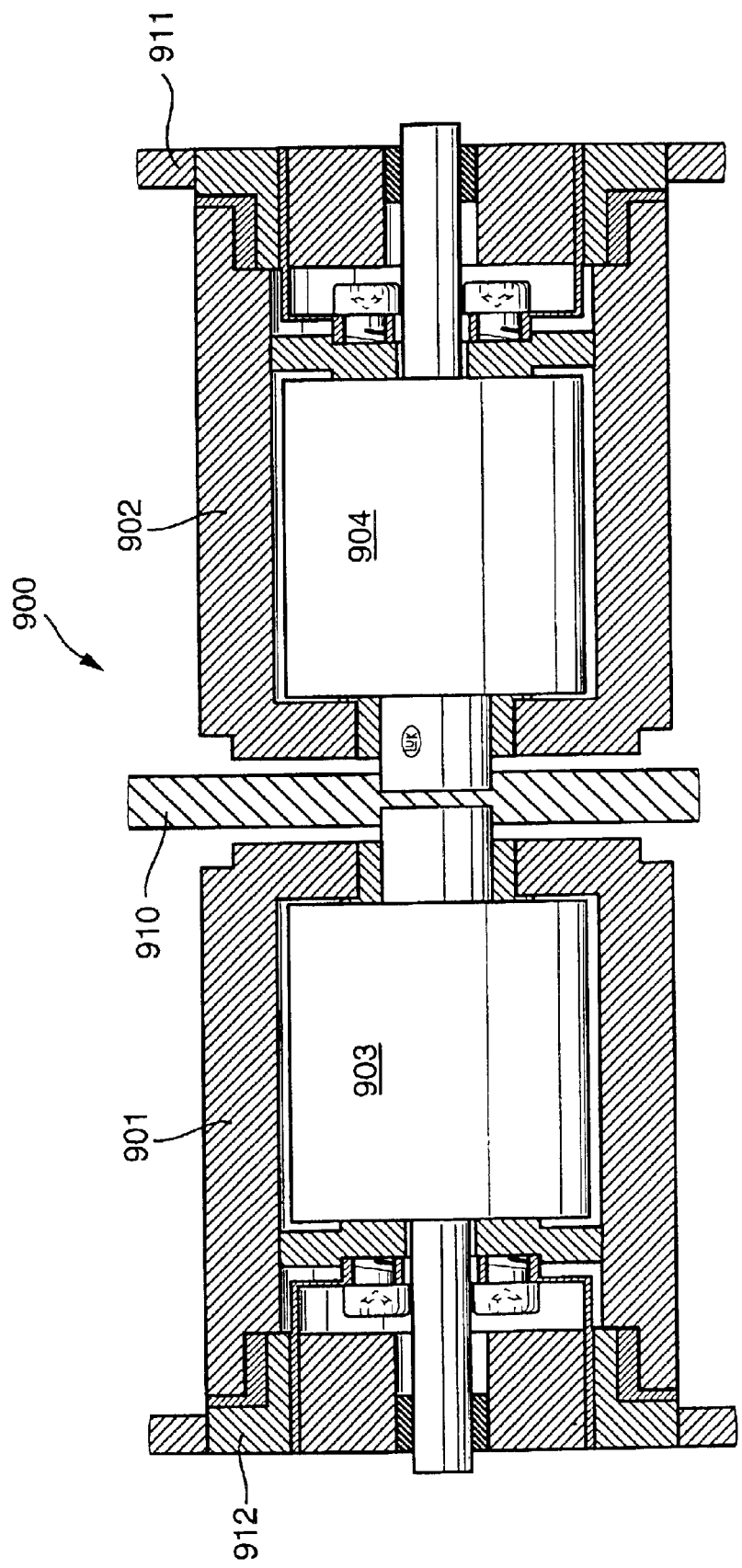
FIG. 15 represents an arrangement of two shift cylinder actuators, e.g., for a dual-clutch transmission.

FIG. 15 represents an actuator arrangement 900 according to the invention with two shift cylinders 901, 902, which can be used, e.g. in a dual-clutch transmission that has two transmission sections, each with a plurality of shiftable gear ratios that can be actuated or shifted in an automated arrangement. The two shift cylinders are actuated by means of the electric motors 903 and 904. The details of how the shift cylinders are driven by the electric motors may be seen in FIG. 12. The shift cylinders 901 and 902 are arranged so that their closed ends face each other and their gear-drive sides face away from each other. The electric motors are non-rotatably installed on a mounting base 910 that is located between the two motors, and the stationary ring gears 911 and 912 are connected to stationary housing parts. The shift cylinders 901, 902 are rotatably supported and can independently control two actuator mechanisms of a vehicle transmission. The embodiment of FIG. 15 has the advantageous traits that the two shift cylinders are arranged in-line on a common axis and the electric motors are accommodated at least in part inside the cylinders 901, 902 to save space.

Without further analysis, the foregoing will so fully reveal the essence of the present invention that others can, by applying current knowledge, readily adapt it for various applications without omitting essential generic or specific features that set the present invention apart from the prior state of the art. Therefore, such adaptations should be understood to fall within the scope and range of equivalence of the appended claims.

What is claimed is:

1. A transmission comprising a transmission actuator device with a shift cylinder and a motor arranged to drive the shift cylinder, wherein the shift cylinder has an outer circumference operatively engaged with shifter elements of the transmission, wherein further the shift cylinder is rotatably supported so that a rotary movement of the shift cylinder causes different transmission ratios to be engaged and disengaged, and wherein the shift cylinder has a recess and at least a part of the motor is received inside the recess.

2. The transmission of claim 1, wherein the motor comprises an electric motor.

3. The transmission of claim 1, further comprising a transmission housing, wherein the motor comprises a motor housing arranged on the transmission housing and constrained from rotating relative to the transmission housing.

4. The transmission of claim 1, further comprising a reduction gearbox interposed between the motor and the shift cylinder, wherein the motor drives the shift cylinder through the reduction gearbox.

5. The transmission of claim 4, wherein further at least a part of the reduction gearbox is received inside the recess.

6. An actuator for controlling an actuating mechanism of a motor vehicle transmission, said actuator comprising a fastening element for mounting the actuator on a carrier element; a shift cylinder arranged to perform rotary movements relative to the fastening element; and an electric motor arranged coaxially inside the shift cylinder, said electric motor having a stator arranged non-rotatably relative to the fastening element, and said electric motor further having a rotor operatively connected to the shift cylinder through a harmonic drive mechanism, wherein the harmonic drive mechanism comprises: a wave generator coupled to the rotor to rotate together with the rotor; a stationary ring-shaped spline gear concentric to the wave generator and non-rotatable relative to the fastening element; and a flexible spline gear arranged between the wave generator and the stationary ring-shaped spline gear, wherein the flexible spline gear is coupled to the shift cylinder to drive the rotary movements of the shift cylinder, wherein the flexible spline gear has fewer teeth than the stationary ring-shaped spline gear, and wherein the wave generator has a contour shaped so that the flexible spline gear and the stationary ring-shaped spline gear mesh with each other at revolving locations of engagement, but are separated from each other in angular sectors between said locations of engagement.

7. The actuator of claim 6, wherein the harmonic drive mechanism has a reduction ratio between −40:1 and −60:1.

8. The actuator of claim 6, wherein said contour is shaped as an ellipse with a major axis and wherein the revolving locations of engagement are at diametrically opposite places on the major axis.

9. The actuator of claim 6, wherein the flexible spline gear is cup-shaped, comprising a ring-shaped portion carrying external spline teeth, a hub portion, and a flexible transition portion connecting the ring-shaped portion to the hub portion, and wherein the hub portion is connected to the shift cylinder.

10. The actuator of claim 9, wherein the hub portion is connected to the shift cylinder by means of screws.

11. The actuator of claim 9, wherein the hub portion is connected elastically to the shift cylinder.

12. The actuator of claim 9, wherein the hub portion is connected to the shift cylinder through an elastic bushing, said elastic bushing being compressively fitted between mutually facing circumferences of the hub portion and the shift cylinder.

13. The actuator of claim 6, further comprising a cylindrical motor housing, wherein the electric motor is arranged inside said motor housing, wherein the ring-shaped spline gear is configured as a part of the motor housing and the shift cylinder is rotatably supported on an external circumference of the motor housing.

14. The actuator of clam 6, comprising two shift cylinders arranged in-line on a central shaft.

15. The actuator of claim 14, wherein the central shaft has an axial groove.

16. The actuator of claim 14, wherein the stator is mounted on the central shaft and the rotor is arranged surrounding the stator.

17. The actuator of claim 6, wherein the actuator is adapted for installation inside a transmission housing.

18. An actuator for actuating one of a clutch-actuating mechanism, a gear-shifting mechanism, and a brake of a motor vehicle, said actuator comprising an electric motor with a rotor shaft, and further comprising a gear-drive mechanism with a sun gear rotationally coupled to the rotor shaft, a ring-shaped planet carrier arranged to revolve coaxially around the rotor shaft, and a set of planet gears arranged symmetrically at angular intervals on the planet carrier; wherein the planet gears mesh with two internally toothed ring gears, one of said ring gears being stationary while the other of said ring gears is connected to a rotary output element coaxial to the rotor shaft, wherein the two ring gears differ in their respective number of teeth, and wherein the gear-drive mechanism has a reduction ratio dependent on said difference in the number of teeth, wherein the rotary output element comprises a shift cylinder adapted for controlling a gear-shifting mechanism.

19. The actuator of claim 18, further comprising a cylindrical motor housing, wherein the electric motor is arranged inside said motor housing, the stationary ring gear is configured as a part of the motor housing, the shift cylinder is rotatably supported on an external circumference of the motor housing and the other of the two ring gears is connected to an internal circumference of the shift cylinder.

20. The actuator of claim 19, wherein the other of the two ring gears is elastically connected to the internal circumference of the shift cylinder.

21. The actuator of claim 20, wherein an elastomeric bushing is compressively fitted between an external circumference of said other of the two ring gears and the internal circumference of the shift cylinder.

22. The actuator of claim 19, further comprising seals between the external circumference of the motor housing and the internal circumference of the shift cylinder.

23. The actuator of claim 19, comprising two shift cylinders arranged coaxially in-line.

24. The actuator of claim 23, wherein one of the shift cylinders comprises a recess and the other of the shift cylinders comprises an axle peg engaged in said recess.

25. The actuator of claim 24, comprising an axial thrust bearing between the shift cylinders.

26. The actuator of claim 25, comprising elastic biasing means exerting an axial biasing force on the axial thrust bearing.

27. The actuator of claim 23, wherein the two shift cylinders are mounted on a central shaft.

28. The actuator of claim 27, wherein the central shaft has an axial groove.

29. The actuator of claim 27, wherein the electric motor in each shift cylinder has a stator mounted on the central shaft and a rotor surrounding the stator.

30. The actuator of claim 19, wherein the actuator is adapted for installation inside a transmission housing.

31. An actuator for actuating one of a clutch-actuating mechanism, a gear-shifting mechanism, and a brake of a motor vehicle, said actuator comprising an electric motor with a rotor shaft, and further comprising a gear-drive mechanism with a sun gear rotationally coupled to the rotor shaft, a ring-shaped planet carrier arranged to revolve coaxially around the rotor shaft, and a set of planet gears arranged symmetrically at angular intervals on the planet carrier; wherein the planet gears mesh with two internally toothed ring gears, one of said ring gears being stationary while the other of said ring gears is connected to a rotary output element coaxial to the rotor shaft, wherein the two ring gears differ in their respective number of teeth, and wherein the gear-drive mechanism has a reduction ratio dependent on said difference in the number of teeth, wherein the actuator includes a spindle element, with the rotary output element driving the spindle element.

32. The actuator of claim 31, wherein the spindle element comprises a revolving ball spindle element with an externally threaded part, an internally threaded part, and a set of roller balls interposed between said threaded parts, wherein one of the threaded parts is connected to the rotary output element while the other of the threaded parts is axially movable but constrained from rotating with the rotary output element.

33. The actuator of claim 32, comprising a compensator spring between said threaded parts.

34. An actuator for actuating one of a clutch-actuating mechanism, a gear-shifting mechanism, and a brake of a motor vehicle, said actuator comprising an electric motor with a rotor shaft, and further comprising a gear-drive mechanism with a sun sear rotationally coupled to the rotor shaft, a ring-shaped planet carrier arranged to revolve coaxially around the rotor shaft, and a set of planet gears arranged symmetrically at angular intervals on the planet carrier; wherein the planet gears mesh with two internally toothed ring gears, one of said ring gears being stationary while the other of said ring gears is connected to a rotary output element coaxial to the rotor shaft, wherein the two ring gears differ in their respective number of teeth, and wherein the gear-drive mechanism has a reduction ratio dependent on said difference in the number of teeth, wherein the actuator includes a gear rack, with the rotary output element driving the gear rack.

35. The actuator of claim 34, further comprising a pinion connected to the rotary output element, wherein the gear rack runs transverse to a rotary axis of the pinion and the pinion meshes with the gear rack.

* * * * *

UNITED STATES PATENT AND TRADEMARK OFFICE
CERTIFICATE OF CORRECTION

PATENT NO. : 6,893,371 B2
DATED : May 17, 2005
INVENTOR(S) : John Mills et al.

It is certified that error appears in the above-identified patent and that said Letters Patent is hereby corrected as shown below:

Title page,
Item [75], Inventor, place of residence, please delete "Bernhard Boll, Alling (DE)" and substitute with -- Bernhard Boll, Wellesbourne, Great Britain --.

Signed and Sealed this

Nineteenth Day of July, 2005

JON W. DUDAS
*Director of the United States Patent and Trademark Office*